United States Patent [19]
Shirkhan

[11] Patent Number: 6,089,538
[45] Date of Patent: Jul. 18, 2000

[54] SOLENOID VALVE HAVING HARD TUBE FLUID CHANNELS IN VALVE SEAT AND FLEXIBLE SEALING DIAPHRAGM

[75] Inventor: Hamid Shirkhan, Newton, Mass.

[73] Assignee: Fluid Management Systems, Inc., Waltham, Mass.

[21] Appl. No.: 09/224,253

[22] Filed: Dec. 30, 1998

Related U.S. Application Data

[60] Provisional application No. 60/070,340, Jan. 2, 1998.

[51] Int. Cl.[7] .................. F17D 1/08; F16K 7/14; F16K 31/06
[52] U.S. Cl. .............. 251/129.17; 137/883; 137/606; 251/331
[58] Field of Search .................. 137/606, 883; 251/129.17, 331

[56] References Cited

U.S. PATENT DOCUMENTS

| | | |
|---|---|---|
| 3,400,732 | 9/1968 | Larrabee . |
| 3,780,981 | 12/1973 | Horak et al. .............. 251/144 |
| 3,991,788 | 11/1976 | Kull ....................... 137/608 |
| 4,203,574 | 5/1980 | Minks ..................... 251/139 |
| 4,295,631 | 10/1981 | Allen ...................... 251/30 |
| 4,344,743 | 8/1982 | Bessman et al. .......... 417/317 |
| 4,376,447 | 3/1983 | Chumley ................. 137/244 |
| 4,505,450 | 3/1985 | Saarem et al. ............ 251/24 |
| 4,815,100 | 3/1989 | Carlson et al. ........... 372/58 |
| 4,911,401 | 3/1990 | Holocomb et al. ....... 251/30.03 |
| 4,915,347 | 4/1990 | Iqbal et al. .............. 251/30.03 |
| 4,921,208 | 5/1990 | LaMarca ................. 251/30.04 |
| 4,944,487 | 7/1990 | Holtermann ............ 251/129.17 |
| 5,222,715 | 6/1993 | Framberg ................ 251/267 |
| 5,265,843 | 11/1993 | Kleinhappl .............. 251/129 |
| 5,333,643 | 8/1994 | Gilchrist et al. ......... 137/605 |
| 5,337,785 | 8/1994 | Romer ................... 137/625.65 |
| 5,431,181 | 7/1995 | Saadi et al. .............. 137/15 |
| 5,520,366 | 5/1996 | Elliott .................... 251/30 |
| 5,601,115 | 2/1997 | Broerman ............... 137/595 |

*Primary Examiner*—John Rivell
*Assistant Examiner*—Meredith H. Schoenfeld
*Attorney, Agent, or Firm*—Weingarten, Schurgin, Gagnebin & Hayes LLP

[57] ABSTRACT

A valve assembly has a unitary teflon valve housing with six peripheral facets. A recessed area on the surface of each facet forms a valve seat. Pairs of fluid channels formed in the housing each terminate at openings at a central, planar area of a corresponding valve seat. A pair of rigid tubes are disposed in the openings at each valve seat, each tube forming a fluid-tight seal with periphery of the corresponding opening. The tubes extend slightly beyond the surface of the housing by a predetermined clearance. A diaphragm made of a resilient material covers the valve seat. The periphery of the diaphragm is in fluid-tight sealing engagement with the periphery of the valve seat. A central portion of the diaphragm is coupled to a solenoid above the diaphragm. The solenoid moves the diaphragm central portion between a closed position toward the valve seat and an open position away from the valve seat. When in the closed position, the diaphragm central portion sealingly covers the extended ends of the tubes while the predetermined clearance is maintained between the diaphragm and the valve seat to prevent fluid-borne particles from being compressed therebetween. When in the open position, the diaphragm central portion uncovers the ends of the tubes to allow fluid to flow between the fluid channels.

9 Claims, 3 Drawing Sheets

SOLENOID VALVE HAVING HARD TUBE FLUID CHANNELS IN VALVE SEAT AND FLEXIBLE SEALING DIAPHRAGM

CROSS REFERENCE TO RELATED APPLICATIONS

This application claims priority from U.S. Provisional Application No. 60/070,340 filed Jan. 2, 1998.

STATEMENT REGARDING FEDERALLY SPONSORED RESEARCH OR DEVELOPMENT

Not Applicable

BACKGROUND OF THE INVENTION

The present invention relates to valves for controlling fluid flow, and more particularly to valves having a resilient diaphragm or similar member that is actuated by a solenoid to open and close a fluid passage.

Solenoid-operated valves are used extensively in many types of fluid distribution systems to control fluid flow. Such valves often employ a diaphragm or similar member made of a resilient material to achieve the desired sealing of one or more fluid passages in the valve when the valve is closed. The movement of the diaphragm between open and closed positions is controlled by the solenoid, which in turn receives a suitable electrical signal from any of a variety of control circuits. For example, the solenoid may be controlled by an output from a workstation that is executing a process control program. In one valve configuration, the diaphragm is pressed against a valve seat to close the valve. In this position the diaphragm sealingly covers one or more openings formed in the valve seat, thereby preventing fluid flow between passages that terminate at the openings. The diaphragm is drawn away from the valve seat to open the valve, and in this position uncovers the openings to allow fluid flow between the passages.

The fluids in some fluid control systems contain small particles in suspension that move through the system along with the fluids. The particles may be desirable constituents or undesirable by-products, such as sediment. In either case, the particles can deleteriously affect the fluid processing equipment. For example, within a valve of the type described above, the particles may be compressed between the diaphragm and the valve seat when the valve is closed. The particles reduce the effectiveness of the seal formed between the diaphragm and the valve seat, so that pressurized operation of the valve is compromised. Also, the particles induce wear (e.g. dents, scratches etc.) on the diaphragm, the valve seat, and other elements of the valve. This induced wear leads to a shortened lifetime and increased failure rate. Permanent damage can result causing leaks through the valve passageways and/or clogging of the valve during operation.

An additional shortcoming of many valves is relatively difficult maintenance. The configuration of some valves is such that the replacement of failure-prone parts entails the partial or complete disassembly of the valve, the availability of special tools or equipment, or other complicating considerations. These difficulties can substantially affect the cost of ownership over a valve's lifetime.

It is desirable to improve the ability of valves used with particle-bearing fluids to operate effectively during pressurized fluid delivery, and to reduce the wearing effect of fluid-borne particles on the elements of the valve, so that valve lifetime and failure rate are reduced. Additionally, it is desirable to improve the maintainability of valves in order to reduce total cost of ownership.

BRIEF SUMMARY OF THE INVENTION

In accordance with the present invention, a valve is disclosed that can be used in pressurized fluid systems and that has improved resistance to failure and wear caused by fluid-borne particles.

In the disclosed valve, a valve housing has a recessed area forming a valve seat and also has a pair of fluid channels formed therein that terminate at a central, planar area of the valve seat. A pair of rigid tubes are respectively disposed in the fluid channels at the valve seat, each tube forming a fluid-tight seal with the rim of the corresponding fluid channel. The tubes extend slightly beyond the surface of the valve seat by a predetermined clearance.

A diaphragm made of a resilient impermeable material covers the valve seat. The peripheral edge of the diaphragm is in fluid-tight sealing engagement with the periphery of the valve seat. The diaphragm has a central portion that is movable between a closed position toward the valve seat and an open position away from the valve seat. This movement of the central portion of the diaphragm is controlled by a solenoid disposed above the diaphragm at the valve seat area. When the diaphragm central portion is in the closed position it sealingly covers the extended ends of the tubes while the predetermined clearance is maintained between the diaphragm and the surface of the valve seat. When the diaphragm central portion is in the open position it uncovers the ends of the tubes to allow fluid to flow therebetween.

Because the structure of the valve prevents the diaphragm from pressing against the valve seat in the closed position, particles suspended in the fluid cannot be trapped and compressed between the diaphragm and valve seat. Therefore the ability of the valve to maintain a pressure seal is improved. Also, the valve is more wear-resistant and less failure-prone.

Other aspects, features, and advantages of the present invention are disclosed in the detailed description which follows.

DETAILED DESCRIPTION OF THE INVENTION

Figure 1:
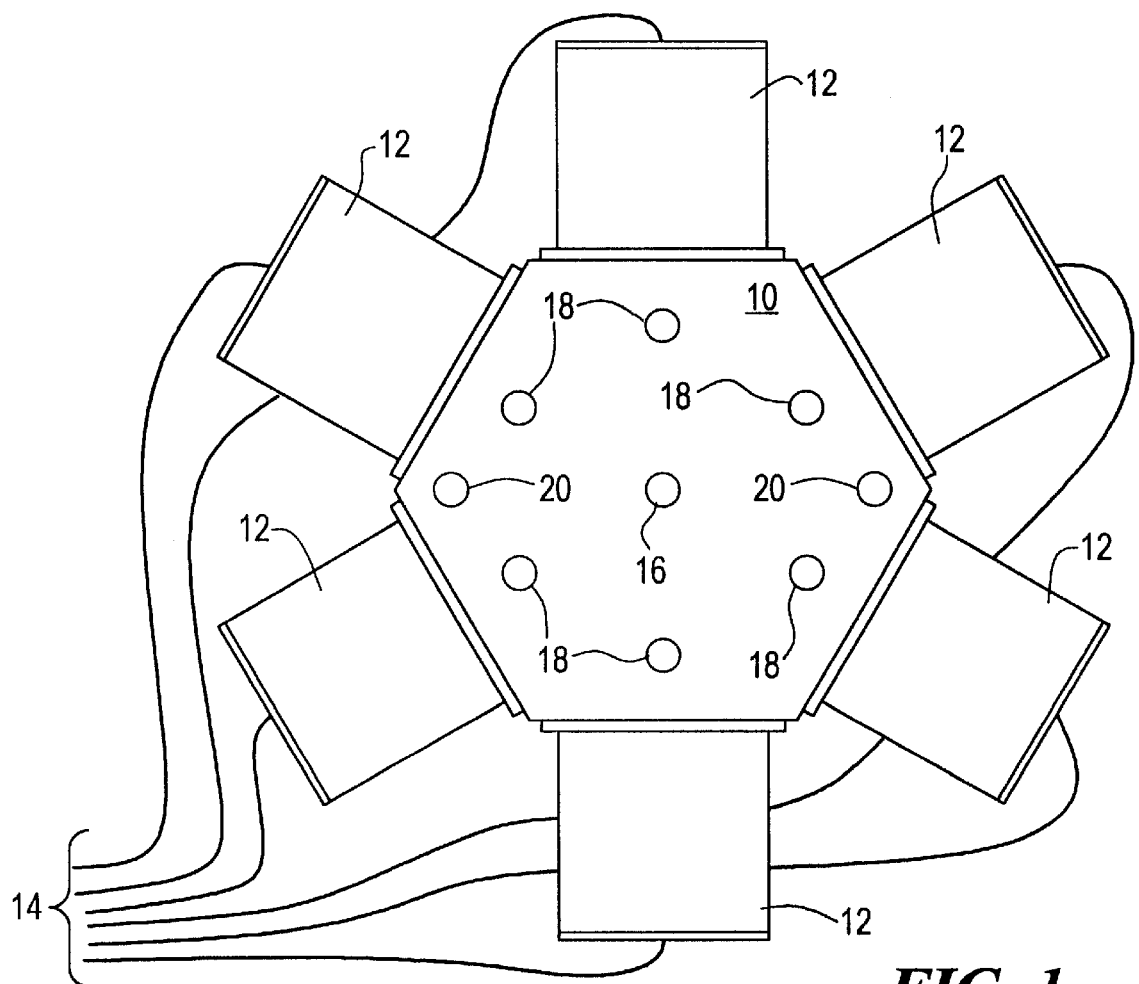
FIG. 1 is a face view of a 6-way valve assembly according to the present invention.

In the 6-way valve assembly of FIG. 1, a valve housing 10 has six solenoids 12 attached around its periphery. The solenoids 12 are operated by corresponding pairs of wires 14 that are to be connected to a controller (not shown in FIG. 1) for the valve assembly. The valve housing 10 is a unitary member made of molded or machined teflon. On the face of the valve housing 10 is a centrally-located shared opening 16, and also six individual openings 18 each located on the housing 10 near a corresponding solenoid 12. Each opening 16 and 18 is threaded to receive a coupling to a tube carrying fluid between the valve assembly and other fluid-processing equipment (not shown in FIG. 1). An additional pair of openings 20 are used for mounting the valve assembly on a holder as required during use.

Figure 2:
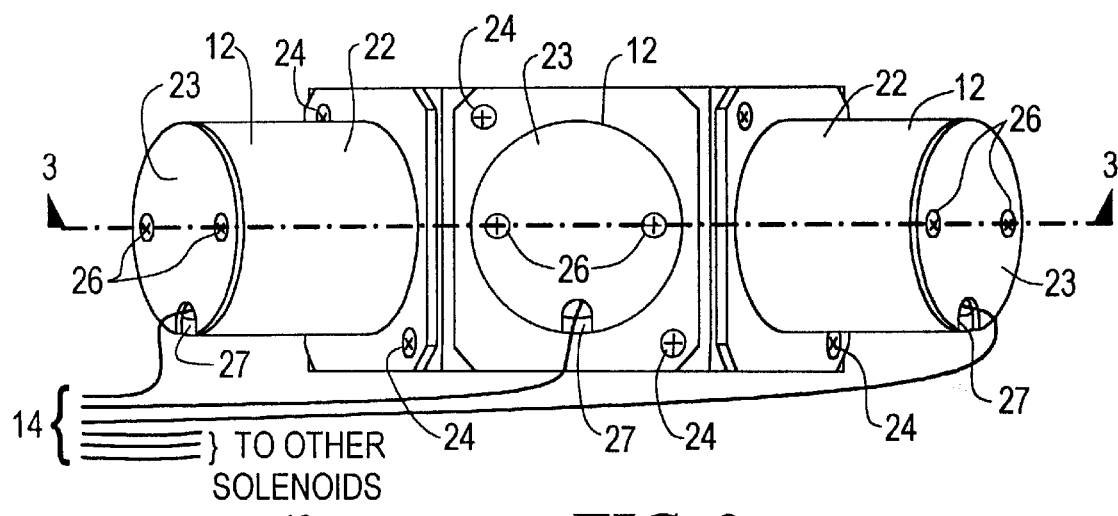
FIG. 2 is an edge view of the valve assembly of FIG. 1.

Referring to FIG. 2, each solenoid 12 has a unitary rigid body 22 and a top cover 23. Each solenoid body 22 is attached by two bolts 24 to the valve housing 10. The bolts 24 engage threaded taps embedded in the housing 10 at the surface thereof. Each top cover 23 is attached to the respective body by bolts 26. Openings 27 in each top cover 23 permit the passage of the wires 14 coming off of an electrical coil (not shown in FIG. 2) within each solenoid 12.

During operation, each solenoid 12 is energized and de-energized to respectively open or close a corresponding one of six fluid passages formed within the housing 10. This operation is described in greater detail below.

Figure 3:
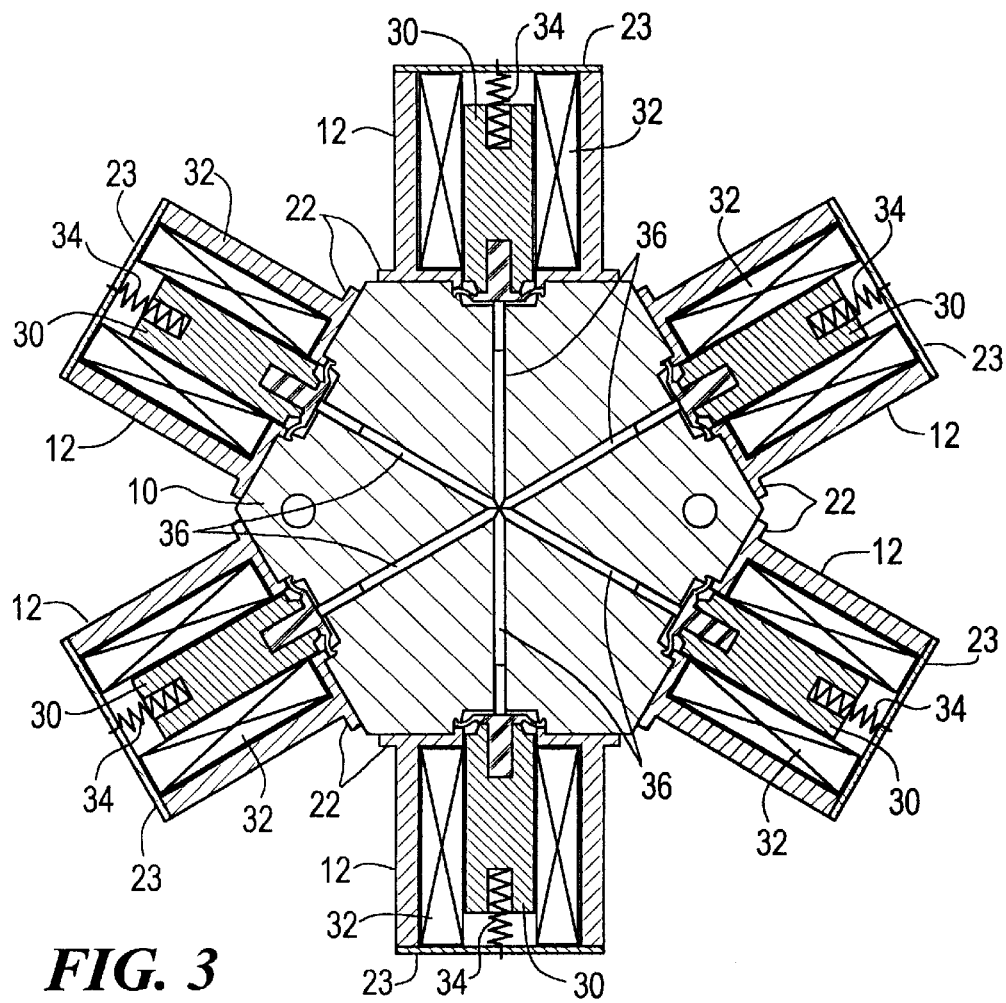
FIG. 3 is a section view along line 3—3 of the valve assembly of FIG. 2.

FIG. 3 shows that each solenoid 12 includes a wire coil 32 and a cylindrical magnetic guide shaft 30 disposed within the coil 32. The guide shaft 30 extends through an opening of the solenoid body 22. A coil spring 34 is disposed in a recess at the outer end of each guide shaft 30 and bears against the top cover 23. Six channels 36 are connected together at the center of the housing 10. Each channel 36 forms a passage between the shared opening 16 of FIG. 1 and an opening in a corresponding valve seat on the surface of the valve housing 10. Details of the valve seat are described below.

Each spring 34 biases the corresponding guide shaft 30 toward the corresponding valve seat, closing the valve. When the coil 32 is energized, the guide shaft 30 is lifted away from the valve seat, toward the outer end of the solenoid 12, so that the valve is opened.

Figure 4:
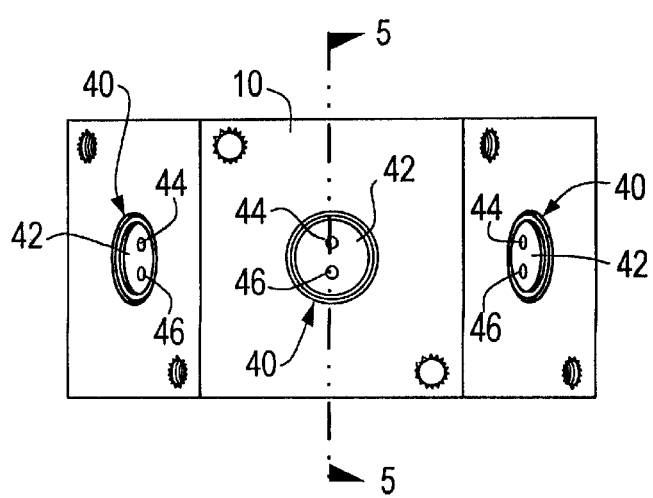
FIG. 4 is an edge view of a valve housing used in the valve assembly of FIG. 1.
Figure 5:
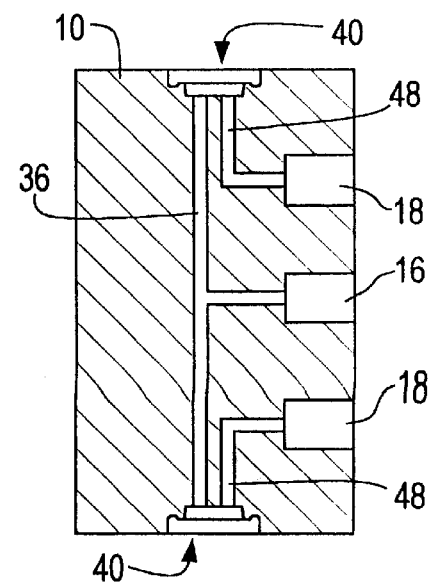
FIG. 5 is a section view along line 5—5 of the valve housing of FIG. 4.

FIGS. 4 and 5 show the valve housing 10 apart from the solenoids 12. Each of the six facets of the housing 10 has a valve seat 40 formed therein. Each valve seat 40 is a generally cylindrical-shaped recess within the respective facet having a flat inner or bottom surface 42. Two openings 44 and 46 are formed in the bottom surface 42 of each valve seat 40. The opening 44 is the terminus of a corresponding shared channel 36 connecting the opening 44 with the shared opening 16 on the face of the housing 10 (FIG. 1). The opening 46 is the terminus of a corresponding individual channel 48 (shown in FIG. 5) connecting the opening 46 with a corresponding individual opening 18 on the face of the housing 10 (FIG. 1).

Figure 6:
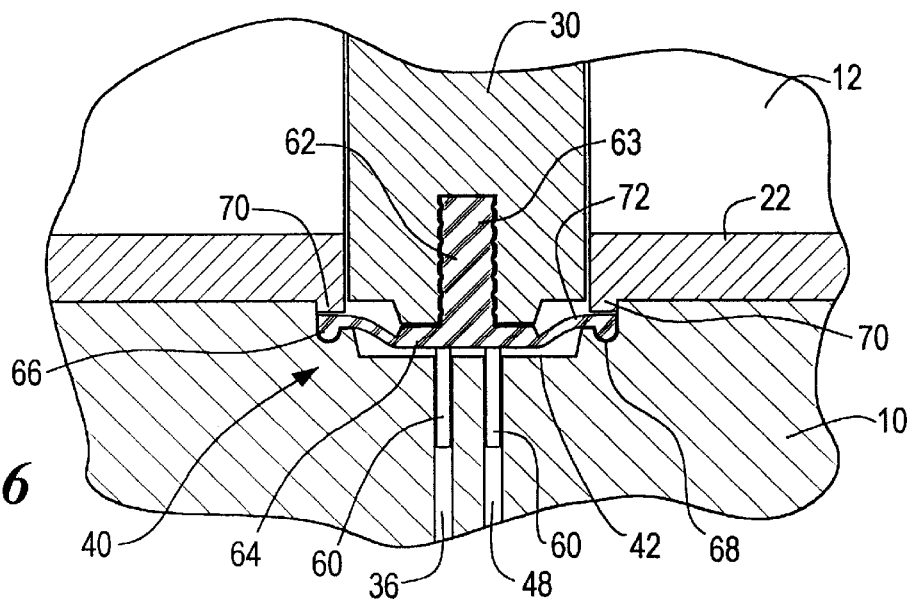
FIG. 6 is a section view of the valve seat area in the valve assembly of FIG. 1 when the valve is in a "closed" position.

FIG. 6 shows the valve seat area 40 and mating section of a solenoid 12 in greater detail. Each channel 36, 48 has a stainless steel tube 60 disposed therein. The tubes 60 may also be made of a hard plastic such as PEEK (Polyetheretherketone) or other rigid inert materials. The outer surface of each tube 60 forms a fluid-tight compressive seal with the periphery of the corresponding channel 36, 48. One end of each tube 60 extends slightly above the bottom surface 42 of the valve seat 40 by a predetermined clearance. The clearance is chosen in a manner described below.

Figure 7:
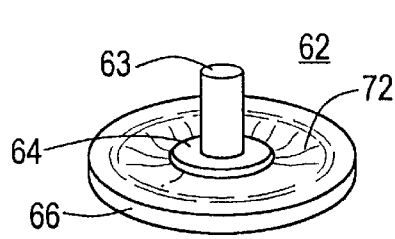
FIG. 7 is a top perspective view of a diaphragm disposed in the valve seat area of FIG. 6.
Figure 8:
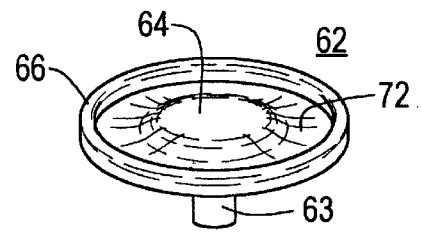
FIG. 8 is a bottom perspective view of the diaphragm of FIG. 7.

A flexible diaphragm 62 is disposed within a threaded recess within the guide shaft 30. The diaphragm 62 is illustrated in FIGS. 7 and 8. The diaphragm 62 has a post-like central portion 63 that is screwed into the threaded recess of the guide shaft 30. The diaphragm 62 is made of a flexible, inert, elastomeric material. A preferred material includes teflon and a perfluoroelastomer such as CHEM-RAZ® (available from Greene, Tweed & Co., Inc.) or KALREZ® (available from DuPont, Inc.).

The diaphragm 62 has a lower central portion 64, and a peripheral sealing edge 66 that generally conforms to a notch 68 formed on the periphery of the valve seat 40. The sealing edge 66 is compressed into the notch 68 by an annular raised extension 70 of the solenoid body 22. The central portion 64 and sealing edge 66 of the diaphragm 62 are joined by a relatively thin, flexible section 72 that enables the central portion 64 to be moved toward and away from the valve seat 40 while the sealing edge 68 is held stationary between the solenoid body 22 and the valve housing 10.

Figure 9:
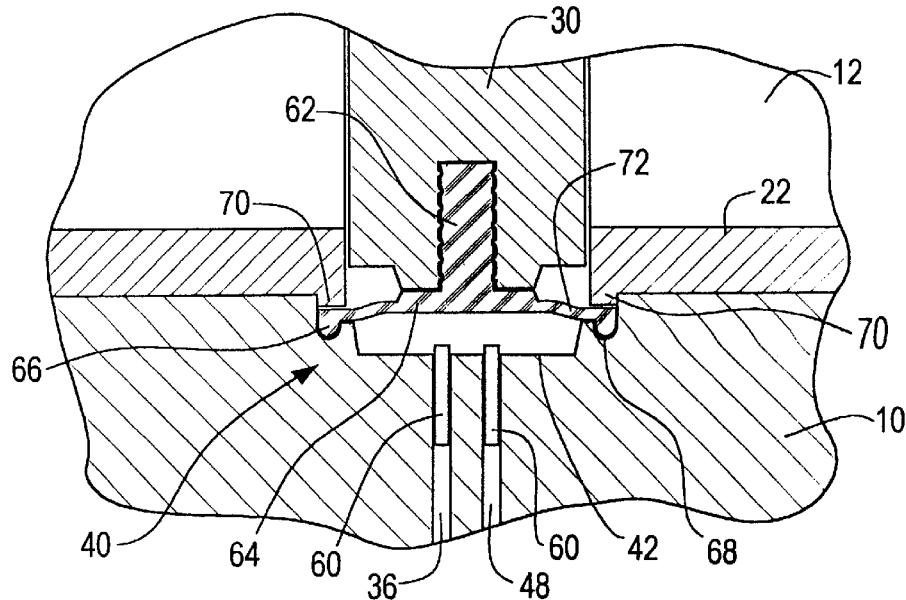
FIG. 9 is a section view of the valve seat area in the valve assembly of FIG. 1 when the valve is in an "open" position.

The closed position of the valve is shown in FIG. 6, and the open position in FIG. 9. The valve is open when the guide shaft 30 is urged away from the valve seat 40 by operation of the coil 32 (FIG. 3). When the valve is open, the ends of the tubes 60 are uncovered, and fluid is allowed to flow between the channels 36 and 48. The valve is closed when the coil 32 is de-energized, so that the guide shaft 30 is urged toward the valve seat 40 by the coil spring 34 (see FIG. 3). When the valve is closed, the central portion 64 of the diaphragm 62 sealingly covers the ends of the tubes 60, and fluid flow between the channels 36 and 48 is prevented. A predetermined clearance is maintained between the diaphragm 62 and the valve seat bottom surface 42. The clearance is substantially equal to the amount by which the tubes 60 extend above the bottom surface 42. This value is chosen to prevent particles that are borne in the fluid from being compressed between the diaphragm 62 and the bottom surface 42 when the valve is closed.

A solenoid-operated valve assembly has been described. It will be apparent to those skilled in the art that modifications to and variation of the above-described valve assembly apparatus are possible without departing from the inventive concepts disclosed herein. Accordingly, the invention should be viewed as limited solely by the scope and spirit of the appended claims.

What is claimed is:

1. A valve, comprising:
   a valve housing having a recessed area forming a valve seat, the valve seat being substantially planar at a central area thereof and having a sealing edge around the periphery thereof, the valve housing having formed therein first and second fluid channels, the channels terminating at openings at the central area of the valve seat;
   a pair of tubes disposed respectively in the fluid channel openings at the valve seat, each tube forming a fluid-tight seal with the periphery of the corresponding opening, and one end of each tube extending slightly above the central area of the valve seat;
   a diaphragm covering the valve seat, the diaphragm being made of a resilient impermeable material and having a peripheral sealing edge in fluid-tight sealing engagement with the sealing edge of the valve seat, the diaphragm having a central portion being movable between a closed position toward the valve seat and an open position away from the valve seat while the sealing engagement between the respective edges of the diaphragm and the valve seat is maintained, the central portion of the diaphragm when in the closed position extending toward the valve seat sufficiently to sealingly cover the extended ends of the tubes, and the central portion when in the open position extending away from the valve seat such that the extended ends of the tubes are uncovered; and a solenoid coupled to the central portion of the diaphragm, the solenoid being operative to maintain the central portion of the diaphragm in both the closed position and in the open position as a function of electrical signals applied to the solenoid, the solenoid applying sufficient force to the diaphragm central portion when in the closed position to maintain the respective seals between the diaphragm central portion and the extended ends of the tubes during pressurized operation of the valve.

2. A valve according to claim 1, wherein the solenoid includes a guide shaft extending along an axis perpendicular to the valve seat and having a recess at the end facing the diaphragm, the guide shaft being movable between first and second positions in response to an electrical signal applied to the solenoid, the first and second positions corresponding respectively to the open and closed positions of the valve, and wherein the diaphragm has a post-like portion extending from the central portion in a direction away from the valve seat, the post-like portion being retained by the guide shaft within the recess thereof so that the central portion of the diaphragm is moved between the open and closed positions as the guide shaft is moved between the first and second positions.

3. A valve according to claim 2, wherein the solenoid comprises:

a body housing the guide shaft;

a spring disposed between the guide shaft and the body, the spring being operative to maintain the guide shaft in the second position when the solenoid is unenergized so that the valve is biased in the closed position; and a coil surrounding the guide shaft, the coil being operative to urge the guide shaft into the first position when the solenoid is energized to thereby open the valve.

4. A valve according to claim 1, wherein the sealing edge of the valve seat has a notch cross section into which the sealing edge of the diaphragm is compressively disposed.

5. A valve according to claim 4, wherein the solenoid includes a body member surrounding the valve seat having a raised portion extending into the notch to hold the sealing edge of the diaphragm against the sealing edge of the valve seat.

6. A valve according to claim 5, wherein the notch has a J-shaped cross section, and wherein the sealing edge of the diaphragm is correspondingly shaped and extends into the notch to sealingly engage the sealing edge of the valve seat.

7. A valve according to claim 1, wherein the sealing edge of the valve seat has a notch cross section into which the sealing edge of the diaphragm is compressively disposed, and wherein the solenoid includes a guide shaft extending along an axis perpendicular to the valve seat, the guide shaft being movable between first and second positions in response to an electrical signal applied to the solenoid, the first and second positions corresponding respectively to the open and closed positions of the valve, the guide shaft being attached to the diaphragm such that the central portion of the diaphragm is moved between the open and closed positions as the guide shaft is moved between the first and second positions, and further comprising a guide shaft holder between the solenoid and the housing, the guide shaft holder having a central opening through which the guide shaft extends, the guide shaft holder having a raised portion surrounding the central opening and extending into the notched sealing edge of the valve seat to hold the sealing edge of the diaphragm against the sealing edge of the valve seat.

8. A valve according to claim 1, wherein the solenoid is operative to normally maintain the central portion of the diaphragm in the closed position and to move the central portion of the diaphragm to the open position in response to the application of an electrical activation signal thereto.

9. A valve, comprising:

a valve housing having a planar face and planar facets arranged symmetrically around the periphery of the face at right angles thereto, the face having a shared opening and individual openings formed therein, the shared opening being located at the center of the face and each individual opening being located near a corresponding one of the facets, each facet having formed therein a recessed area forming a valve seat, the valve seat being substantially planar at a central area thereof and having a sealing edge around the periphery thereof, the valve housing having formed therein a set of shared fluid channels and a set of individual fluid channels, each of the shared channels extending between the shared opening and a first opening at a corresponding valve seat, each individual channel extending between a corresponding individual opening and a second opening at a corresponding valve seat;

pairs of tubes, the tubes in each pair being disposed respectively in the first and second openings at a corresponding valve seat, each tube in each pair forming a fluid-tight seal with the periphery of the corresponding opening, and one end of each tube extending slightly beyond the corresponding valve seat;

diaphragms, each diaphragm covering a corresponding valve seat, each diaphragm being made of a resilient impermeable material and having a peripheral sealing edge in fluid-tight sealing engagement with the sealing edge of the valve seat, the diaphragm having a central portion being movable between a closed position toward the valve seat and an open position away from the valve seat while the sealing engagement between the respective edges of the diaphragm and the valve seat is maintained, the central portion when in the closed position extending toward the valve seat sufficiently to sealingly cover the extended ends of the tubes, and the central portion when in the open position extending away from the valve seat such that the extended ends of the tubes are uncovered; and solenoids, each solenoid being attached to the housing at a corresponding one of the valve seats and having a movable guide shaft to which the central portion of the corresponding diaphragm is coupled, each solenoid being operative to maintain the central portion of the diaphragm in both the closed position and in the open position as a function of electrical signals applied to the solenoid, the solenoid applying sufficient force to the diaphragm central portion when in the closed position to maintain the respective seals between the diaphragm central portion and the extended ends of the tubes during pressurized operation of the valve.

* * * * *